United States Patent Office.

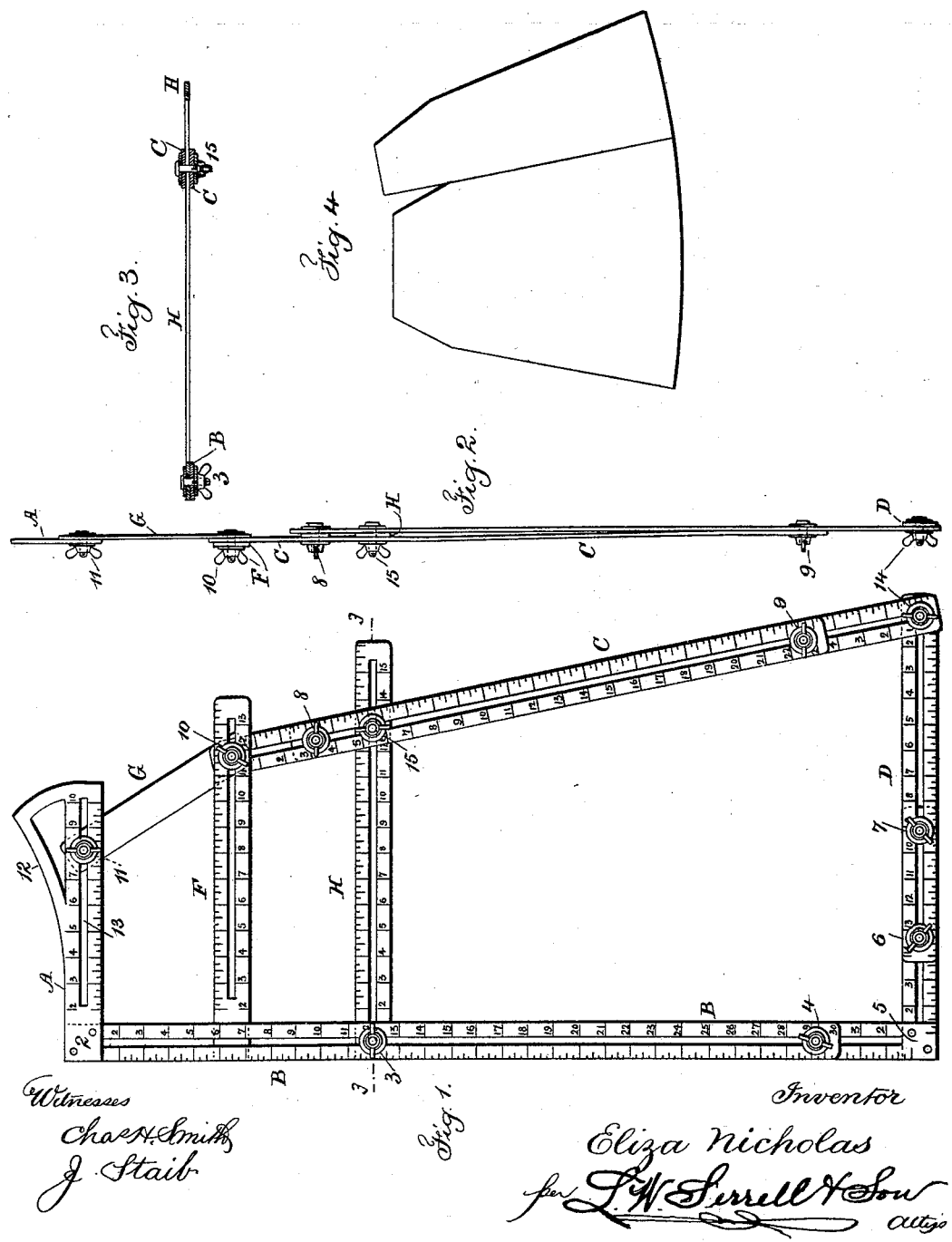

ELIZA NICHOLAS, OF PLAINFIELD, NEW JERSEY.

MEASURE FOR DRAFTING DRESS-SKIRTS.

SPECIFICATION forming part of Letters Patent No. 622,900, dated April 11, 1899.

Application filed February 6, 1899. Serial No. 704,651. (No model.)

*To all whom it may concern:*

Be it known that I, ELIZA NICHOLAS, a citizen of the United States, residing at Plainfield, in the county of Union and State of New Jersey, have invented an Improvement in Measures for Drafting Dress-Skirts, of which the following is a specification.

Difficulty has heretofore arisen in properly drafting and laying out dress-skirts, especially those that fit the person closely, and measurements for length and waist and at the bottom of the skirt that might fit a comparatively thin person are not adapted to a person that is stout.

The present invention relates to a measure adapted to laying out with accuracy the upper part of the skirt-section so as to fit the hips of the wearer as well as the waist. I make use of a peculiar waist-measure in connection with extensible measures adapted to reach to the bottom of the skirt and an extensible measure for the lower edge of the skirt, and with these I combine a hip-measure adapted for determining the size and shape of the gores at the upper ends of the skirt-sections, so that the skirt fits properly at the waist and over the hips and is of the proper length for the wearer.

In the drawings, Figure 1 represents the drafting instrument. Fig. 2 is an edge view of the same. Fig. 3 is a section at the line 3 3 of Fig. 1, and Fig. 4 is a diagram illustrating the manner in which two sections may be cut out in making a skirt.

The waist-measure A and the perpendicular measure B are united together at 2 in any suitable manner, and the perpendicular measure B is made of two parts, so as to be extensible, and these parts are advantageously slotted and provided with clamping-nuts at 3 and 4, so that the measure can be held after it has been extended or contracted to bring the lower end at the bottom edge of the skirt, and the edge measure D is united to the lower end of the perpendicular measure B, as at 5, and this measure is slotted and provided with nuts 6 and 7, so as to be extensible, and the inclined measure C is made of two parts, so as to be extensible, and clamped by the nuts 8 and 9, and the upper end of this inclined measure terminates at the hip-measure F, which hip-measure is slotted, and the parts are connected by the screw and clamping-nut 10, and the gore-measure G extends from the upper end of the inclined measure C to the waist-measure A, there being a slot in the waist-measure for the screw of the nut 11, by which the gore-measure is clamped to the waist-measure at any place at which it may be set.

The waist-measure is not a tape or strip, as heretofore usual; but its upper edge 12 is concave, so that the slot 13 for the bolt or nut 11 may be at right angles to the perpendicular measure B; but the top edge of the waist-measure can set accurately against the waist of the person in taking the measure. The surfaces of the respective measures are divided up into inches or other suitable standards, as illustrated in the drawings, and the measuring instrument may be made of thin sheet metal or other suitable material.

In using this instrument the waist-measure A is applied with its edge 12 against the waist and the perpendicular measure B passes down to the edge of the skirt, and the two parts composing this measure B are adjusted and clamped by the nuts 3 and 4 so that the lower end of the perpendicular measure is at the proper place for the bottom of the skirt. The nut 10 is loosened and the inclined measure adjusted at the upper end to the proper place upon the hip according to the number of sections made use of in the skirt, so that the edge of the inclined measure C at the top end will represent by the divisions on the hip-measure F the proper width for the skirt-section at the hip, and the gore-measure G is to be moved at the upper end so as to be substantially perpendicular to the curved edge 12 of the waist-measure A, and the skirt-edge measure D is to be extended or contracted so that the bolt and nut 14 occupy the proper position for the measure C to represent the inclined edge of the skirt-section, and the nuts 6 and 7 are to be clamped to hold the skirt-edge measure at the place to which it has been adjusted.

It is advantageous to make use of a secondary hip-measure H, connected at one end by the bolt and nut 3 and slotted for the bolt and nut 15, by which it can be united to the inclined measure C, and by this secondary hip-measure the proper fullness of this dress-section upon the hip can be readily determined.

The parts of this measure being adjusted and clamped as aforesaid can be laid directly upon the fabric, so as to mark out the skirt-section, or the measures can be noted and laid out upon a fabric after all the measures have been taken, and it is to be understood that this instrument is applied successively around the waist of the person to measure the skirt-sections so that they can be laid out properly upon the skirt fabric, so that such sections can be cut out and then brought together as usual.

By the present improvement the skirt can be accurately laid out with reference to the waist-measure, the hip-measure, and the length of the skirt, in order that the respective sections may fit the wearer whether the hips may be large or small, and by using the instrument in laying out the measurements upon the fabric it is only necessary to bring the respective bolts and nuts to the marks or divisions upon the various parts, and the upper waist-measure being curved will give the proper curvature to the skirt-section and the proper measurements for the gore and for the inclined side of the skirt-section without the necessity of measuring the length of the inclined edge of the gore, because the gore-measure G will determine accurately the position and inclination of the edge of the section near the waist portion of such section.

I claim as my invention—

1. The combination with the perpendicular measure, the inclined measure and the skirt-edge measure, of a waist-measure having a concave upper edge and a slot substantially at right angles to the perpendicular measure, and a gore-measure connected at its upper end with the waist-measure, and at its lower end with the inclined measure, substantially as set forth.

2. The combination in a device for measuring and drafting dress-skirts, of a waist-measure, an extensible perpendicular measure, an extensible skirt-edge measure, an extensible inclined measure and a gore-measure connected with the upper end of the inclined measure and with the waist-measure and a hip-measure connected at one end with the perpendicular measure and receiving the upper end of the inclined measure and the lower end of the gore-measure, substantially as set forth.

3. The combination in a device for measuring and drafting dress-skirts, of a waist-measure, an extensible perpendicular measure, an extensible skirt-edge measure, an extensible inclined measure and a gore-measure connected with the upper end of the inclined measure and with the waist-measure and a hip-measure connected at one end with the perpendicular measure and receiving the upper end of the inclined measure and the lower end of the gore-measure, and a secondary hip-measure connected at one end to the perpendicular measure and a clamping device for connecting the secondary hip-measure to the inclined measure, substantially as set forth.

Signed by me this 26th day of January, 1899.

ELIZA NICHOLAS.

Witnesses:
RACHEL CODINGTON,
ALBERT I. CODINGTON.